United States Patent [19]
Zikeli et al.

[11] Patent Number: 5,607,639
[45] Date of Patent: Mar. 4, 1997

[54] PROCESS FOR THE PREPARATION OF CELLULOSE SHEET

[75] Inventors: Stefan Zikeli, Regau; Friedrich Ecker, Timelkam; Ernst Rauch, Schörfling; Klaus Renner, Lenzing; Anton Schönberg, Regau, all of Austria

[73] Assignee: Lenzing Aktiengesellschaft, Austria

[21] Appl. No.: 221,174

[22] Filed: Mar. 31, 1994

[30] Foreign Application Priority Data

Sep. 13, 1993 [AT] Austria .................. 1845/93

[51] Int. Cl.⁶ .................. B29C 47/88
[52] U.S. Cl. .................. 264/561; 264/562; 264/563; 264/186; 264/203
[58] Field of Search .................. 264/186, 187, 264/203, 207, 561, 563, 562, 198, 200

[56] References Cited

U.S. PATENT DOCUMENTS

| | | |
|---|---|---|
| 2,179,181 | 11/1939 | Graenacher et al. . |
| 2,284,028 | 5/1942 | Ubbelohde . |
| 3,118,012 | 1/1964 | Kilian . |
| 3,824,050 | 7/1974 | Balk . |
| 4,144,080 | 3/1979 | McCorsley, III . |
| 4,261,943 | 4/1981 | McCorsley, III . |
| 4,440,711 | 4/1984 | Kwon et al. . |
| 4,713,290 | 12/1987 | Kwon et al. . |
| 5,094,690 | 3/1992 | Zikeli et al. . |
| 5,252,284 | 12/1993 | Jurkovic et al. . |
| 5,277,857 | 1/1994 | Nicholson et al. ............ 264/187 |
| 5,451,364 | 9/1995 | Ducharme, Jr. et al. ........ 264/186 |

FOREIGN PATENT DOCUMENTS

| | | |
|---|---|---|
| 1135918 | 11/1982 | Canada . |
| 105169 | 4/1984 | European Pat. Off. . |
| 494852 | 7/1992 | European Pat. Off. . |
| 356419 | 12/1992 | European Pat. Off. . |
| 2830685 | 2/1979 | Germany . |
| 2844163 | 5/1979 | Germany . |
| 3406346 | 10/1984 | Germany . |
| 218121 | 1/1985 | Germany . |
| 57-161113 | 3/1981 | Japan . |
| 61-119704 | 6/1986 | Japan . |
| 807248 | 1/1959 | United Kingdom . |
| 957534 | 5/1964 | United Kingdom . |
| 9313670 | 7/1993 | WIPO . |
| WO93/19230 | 9/1993 | WIPO ................ 264/187 |

OTHER PUBLICATIONS

English language abstract of German Patent No. 218 121.
English language abstract of German Patent No. 28 30 685.
English language abstract of German Patent No. 28 44 163.
English language abstract of German Patent No. 3 406 346.
English language abstract of J57-161113.
English language abstract of J61-119704.
English language abstract of European Patent No. 105 169.
English language abstract of European Patent No. 356 419.
English language abstract of European Patent No. 494 852.
English language abstract of Austrian Patent Application No. 2724/89.

*Primary Examiner*—Mathieu D. Vargot
*Attorney, Agent, or Firm*—Brumbaugh, Graves, Donohue & Raymond

[57] ABSTRACT

Method for the preparation of cellulose sheet by extrusion of a heated solution of cellulose in a tertiary amine-oxide, which method includes using an extrusion die with an extrusion orifice, characterised in that, immediately below the extrusion orifice there is provided an inlet for cooling gas to cool the extruded sheet. The method according to the invention is especially suitable for the preparation of cellulose tubular films.

10 Claims, 2 Drawing Sheets

PROCESS FOR THE PREPARATION OF CELLULOSE SHEET

FIELD OF THE INVENTION

The present invention concerns a device and a process for the preparation of cellulose sheet by extrusion of a heated solution of cellulose in a tertiary amine-oxide through an air-gap and into a precipitation bath. The present invention concerns in particular a device and a process for the preparation of cellulose tubular film. In the sense of the following specification and Patent Claims, the term "sheet" is to be understood to also include planar mouldings such as films.

BACKGROUND OF THE INVENTION

From U.S. Pat. No. 2,179,181 it is known that tertiary amine-oxides have the property of dissolving cellulose and that cellulose mouldings such as fibres can be obtained from these solutions by precipitation. A process for the preparation of such solutions is known for example from EP-A 0 356 419. According to this publication a suspension of cellulose is firstly prepared in an aqueous tertiary amine-oxide. The amine-oxide contains up to 40 wt % water. The aqueous cellulose suspension is heated and water is removed under reduced pressure until the cellulose dissolves.

When preparing cellulose fibres, it is known from DE-A 2 844 163 that an air gap can be provided between the spinning die and the precipitation bath to achieve drawing at the die. This drawing at the die is necessary because drawing of the fibres becomes very difficult after contact of the shaped spinning solution with the aqueous precipitation bath. The fibre structure which is set in the air gap is fixed in the precipitation bath.

A process for the preparation of cellulose fibres is also known from DE-A 2 830 685, wherein a solution of cellulose in a tertiary amine-oxide is shaped in hot condition to give filaments which are cooled with air and then introduced into a precipitation bath in order to precipitate the dissolved cellulose. The surface of the spun fibres is also wetted with water to reduce their tendency to adhere to neighbouring fibres.

A device and a process of the type mentioned above for the preparation of seamless tubular film is known from WO 93/13670. According to this known process the cellulose solution is passed through an extrusion die having a ring-shaped extrusion orifice to give a tube which is drawn over a cylindrical mandrel and then introduced into a precipitation bath. To ensure that the extruded tube does not adhere to the surface of the mandrel, its surface is covered with a film of water so that the inner side of the tube coagulates and slides over the cylindrical mandrel. This has the disadvantage however that the water used to wet the surface of the mandrel can rise to the extrusion orifice and wet the die lip, which not only leads to unwanted coagulation in the actual extrusion process but also leads to the extrusion die being cooled. This is undesirable because the cooled die cools the solution to be extruded thus increasing its viscosity, so that trouble-free extrusion to give sheet with a uniform thickness is no longer possible. In addition the device previously cited must undergo a costly rebuild when for instance sheets of varying thicknesses are to be prepared.

A further disadvantage of the device described in WO 93/13670 is that it does not allow high production rates. This is because the cooling of the extrudate is not efficient enough; the reason is that the heat cannot be dissipated quickly enough from the hot extruded sheet.

On account of their extraordinarily high viscosity among other reasons, the cellulose solutions which are to be extruded must be heated to temperatures above 110° C. so that they may be processed at all. After the extrudate emerges from the die lips the extruded solution should cool down to a certain extent and solidify so that it can be drawn before its introduction into the precipitation bath, ie, before coagulation. If the cooling is not efficient then the residence time of the extruded solution in the air gap must be correspondingly lengthened which can be achieved only by reducing the draw-off speed. If on the other hand extrusion is carried out at a lower temperature then problems arise with the distribution of material in the extrusion device.

SUMMARY OF THE INVENTION

The object of the present invention is to provide a device and a process for the preparation of cellulose sheet by extrusion of a heated solution of cellulose in a tertiary amine-oxide, which do not exhibit the disadvantages cited above and which in particular exhibit a high production capacity.

The device according to the invention of the type mentioned above for the preparation of cellulose sheets comprises an extrusion die with an extrusion orifice and is characterised in that immediately below the extrusion orifice a cooling gas inlet is provided for cooling the extruded sheet. Cooled air for example at a temperature from −10° C. to +5° C. is suitable as the cooling gas. Air at room temperature can also be used to cool the heated extrudate. It is obvious that with gas cooling according to the invention and by using the parameters of temperature and input amount, the cooling capacity can be matched in a simple way to the relevant process conditions, whereby the productivity is considerably increased.

An effective embodiment of the device according to the invention is that an inlet for cooling gas is provided at both sides of the extrusion orifice.

A preferred embodiment of the device according to the invention is used for the preparation of cellulose tubular film and is characterised in that the extrusion orifice of the extrusion die is designed essentially ring-shaped and that the inlet for cooling gas is provided outside the ring formed by the extrusion orifice. This embodiment of the device according to the invention is well suited for the preparation of tubular film with a relatively small diameter, for example, of less than 70 mm.

Another preferred embodiment of the device according to the invention with a ring-shaped design of the extrusion orifice is used for the preparation of cellulose tubular film with a larger diameter and is characterised in that the inlet for cooling gas is provided inside the ring formed by the extrusion orifice. In this case an outlet, located inside the ring formed by the extrusion orifice, must also be provided for used cooling gas because the used cooling gas cannot get out through the closed tube. The inlet for cooling gas is most preferably designed such that cooling gas is directed at the outlet edge of the extrusion orifice.

For especially efficient cooling, this embodiment of the device according to the invention has a further inlet for cooling gas which is located outside the ring formed by the extrusion orifice.

Especially desirable is a device which has yet another inlet for a cellulose precipitation agent and an outlet for the precipitation bath liquid, both located in the centre of the ring formed by the extrusion orifice.

It has also proved to be effective when the device according to the invention has at least one distance plate below the outlet for the precipitation bath liquid. This feature effectively prevents the extruded sheet from collapsing in the precipitation bath.

The invention further concerns a process for the preparation of cellulose sheet in which a solution of cellulose in a tertiary amine-oxide is extruded in the heated state through an extrusion die with an extrusion orifice, and the heated extruded solution is led into a precipitation bath to precipitate the dissolved cellulose, the process being characterised in that the heated extruded solution is cooled by exposure to a gas stream immediately after extrusion and before its introduction into the precipitation bath. It has proved to be especially effective when the gas stream is essentially at right angles to the direction of extrusion.

Efficient cooling occurs when the heated extruded solution is exposed to two gas streams, which is best achieved by the two gas streams striking the hot extruded solution on its opposing sides.

The process according to the invention can be applied to the preparation of cellulose tubular film having a relatively small diameter (for example, less than 70 mm) when the heated cellulose solution is extruded in the shape of a tube through an extrusion die with a ring-shaped extrusion orifice, the heated tubular-shaped extruded solution being exposed to the gas stream at its outer side. To prepare tubular films with a larger diameter, it is best when the extruded solution is cooled from the inside. Also in this embodiment of the process according to the invention, especially efficient cooling can be achieved when the heated tubular-shaped extruded solution is exposed to a gas stream not only at its inner side but also at its outer side.

It has proved to be efficient when the heated tubular-shaped extruded solution, after cooling and before its introduction into the precipitation bath, is brought into contact on its inner side with a cellulose precipitation agent.

The device according to the invention and the process according to the invention are especially well suited for the processing of aqueous solutions of cellulose in N-methylmorpholine-N-oxide (NMMO).

BRIEF DESCRIPTION OF THE DRAWINGS

The preferred embodiment of the invention is further explained by means of the attached Drawings, wherein FIG. 1 schematically shows a device for the preparation of cellulose sheet and FIG. 2 schematically shows a device for the preparation of cellulose tubular film.

Figure 1:
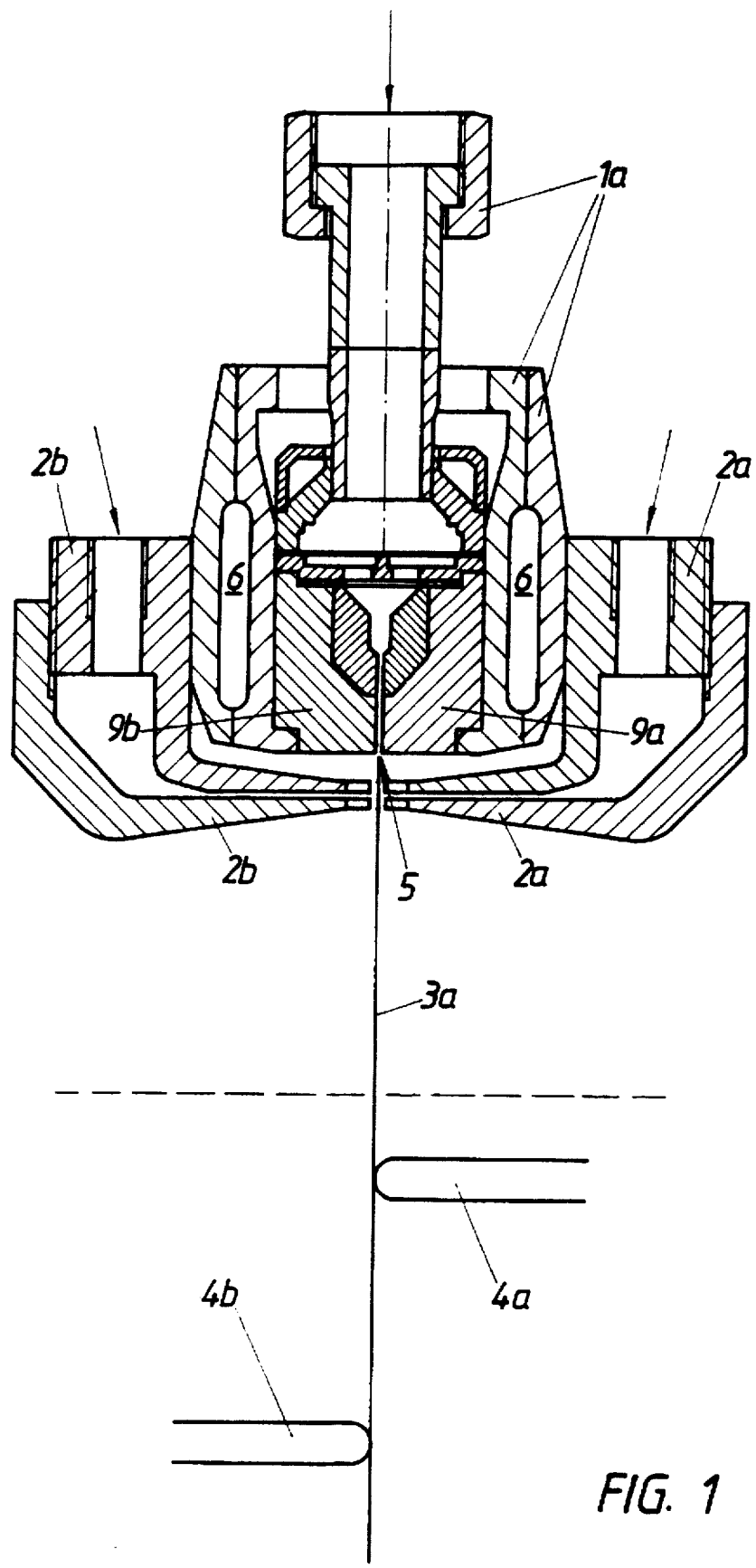
FIG. 1 shows a cross-section of an elongated extrusion device which essentially consists of an extrusion die 1a and two inlets 2a and 2b for cooling gas by which the film-like extruded solution 3a is cooled on both sides. The introduction of cooling air into the inlets 2a and 2b is shown by arrows pointing downwards. The cooled extruded product is drawn through an air gap, which is determined by the distance between the underside of the die and the surface of the precipitation bath, and passes into the precipitation bath where the cellulose is precipitated. The tertiary amine-oxide is taken up by the precipitation bath. The surface of the precipitation bath is indicated by an hyphenated line and two guide strips located in the precipitation bath are indicated by 4a and 4b. The sheet is deflected by a roller (not shown) in the precipitation bath and is then drawn out from the precipitation bath.

As can be seen from FIG. 1, the extrusion die 1a consists of several components which can be screwed or keyed to one another. The construction of this die corresponds to the construction of those dies which are usually used for the melt extrusion of highly-viscous, polymeric materials. It is advantageous for example to provide devices (not shown) inside the die to ensure uniform distribution of the material to be extruded.

The NMMO cellulose solution is passed under pressure from above (indicated by a vertical arrow) into the extrusion die 1a and forced through a filter plate which is represented in the Figure by a thick black line. This filter plate is carried by a supporting plate which is located beneath it. Thereafter the filtered extrusion product passes into the actual die body which is formed by the components 9a and 9b. The NMMO cellulose solution is extruded through the extrusion orifice 5. The extrusion orifice 5 has a cross-sectional enlargement which acts as a decompression zone. The extrusion die 1a is heated indirectly by a heat transfer medium which is led through the slit-shaped channel 6.

Heat insulation (not shown) can be provided between the extrusion die 1a and the cooling gas inlets 2a and 2b, to prevent heat transfer from the die 1a to the inlets 2a and 2b.

Adjustment of the die cross-section can be effected with relative simplicity by replacing the two components 9a and 9b, wherein the dimensions of the remaining components of the device do not have to be changed, which represents a decisive advantage of the device according to the invention.

DETAILED DESCRIPTION OF THE PREFERRED EMBODIMENTS

FIG. 1 shows a device in which cooling gas can be blown onto both sides of the extruded product, wherein the direction of blowing is essentially at right angles to the direction of extrusion.

Figure 2:
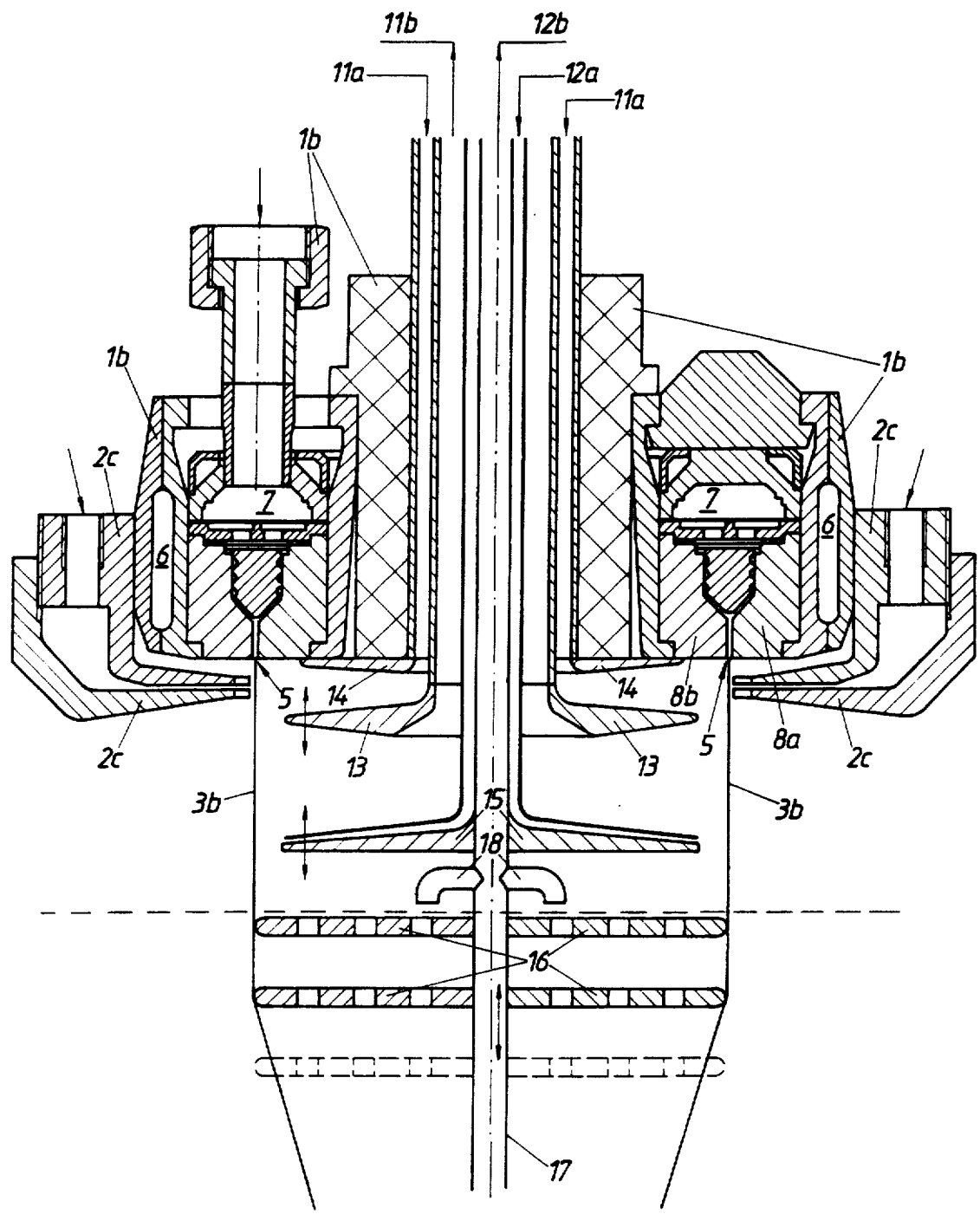

FIG. 2 shows the cross-section of a device according to the invention for the preparation of tubular film. The device consists essentially of a ring-shaped extrusion die 1b comprising several components which can be screwed or keyed to one another. The cellulose solution is fed off-centre from above as shown by the vertical arrow in FIG. 2. The extrusion material passes into a ring-shaped distribution chamber 7 which is heated from the outside. From the ring-shaped distribution chamber 7, the solution is forced through a ring-shaped filter plate which is represented in the Figure by a thick black line and which is carried by a supporting plate located beneath it. The filtered solution then passes into the divided die body which is formed by two ring-shaped halves 8a and 8b. Also in this embodiment of the device according to the invention, an enlargement for decompression is provided at the extrusion orifice 5. The extrusion product is forced as a tubular heated extrudate from the die lips of the extrusion orifice 5 into the air gap.

Just as in the device shown in FIG. 1, here too the adjustment of the die cross-section can be effected with relative simplicity by replacing the two components 8a and 8b.

A ring-shaped body which is provided with screw shaped passages at both its inner side and its outer side is located in the ring-shaped recess formed by the two components 8a and 8b; the filtered solution is forced through these passages into the extrusion orifice.

Inlets and outlets for cooling air and used cooling air respectively, and inlets and outlets for water and precipitation bath liquid respectively, are provided in the form of concentric tubes in the centre of the ring die 1b. The inlet for cooling air is given the reference symbol 11a; this air passes to a baffle plate 13 which has good air-flow properties where the air is deflected to the horizontal and then strikes the tubular extruded solution 3b on the inside of the tube. A metal guide 14 ensures that part of the cooling air directly strikes the outlet edge of the extrusion orifice 5. The used cooling air makes an exit through the outlet 11b.

To improve the cooling, an inlet 2c for cooling air is provided outside the ring formed by the extrusion orifice 5. The provision of this second cooling air is indicated—as in FIG. 1—by two arrows pointing downwards.

Below the baffle plate 13 there is provided a plate-shaped disc 15 by which means the inner surface of the tube 3b is wetted with precipitation agent (water). The inlet for this precipitation agent is indicated by the symbol 12a.

In order to handle a relatively long cylinder of film, immediately below the surface of the precipitation bath (indicated with an hyphenated line) there are provided spacer plates 16 whose outer edges are rounded off so that the coagulated but still delicate film is not damaged when sliding over them. It is highly desirable to ensure that the contact surface, which is a rubbing surface between the distance plate 16 and the film 3b, is kept small.

The spacer plate 16 is submerged in the precipitation bath and also functions to pacify the bath. Drillings are also provided through which an exchange of material can occur.

The guiding of the tubular film through the precipitation bath can involve several spacer plates 16 before the film is deflected over the guide rollers (not shown) in the precipitation bath.

In the device represented in FIG. 2 a dip pipe 17 is also provided through which used precipitation agent, which was fed in through 12a, can be sucked out again. Suction pipes 18, which lead into this dip pipe, are also provided immediately above the surface of the precipitation bath.

The function of this dip pipe is as follows: as long as the suction pipes 18 are not immersed below the surface of the precipitation bath, air and not liquid is sucked up. As soon as the level of the precipitation bath rises and the two suction pipes become immersed, the precipitation bath liquid is sucked up not only through the dip pipe 17 but also through the suction pipes 18 until such time as the two suction pipes emerge again from the precipitation bath and air is sucked up again. Such measures also ensure that there is no increase of concentration of the NMMO in the precipitation bath in the lower parts of the tubular film, which is standing in the parts contacting the inside of the film.

It is desirable that the baffle plate 13 and the plate-shaped disc 15 are fastened to the dip pipe 17 in a movable fashion so that the cooling and the internal wetting can be regulated, The cooling according to the invention is of such efficiency that films can be extruded at higher material throughputs than is possible with those extrusion devices for cellulose solutions which are proposed in the prior art.

We claim:

1. Process for the preparation of cellulose sheet comprising the steps of:

providing a heated solution of cellulose in tertiary amine oxide, extruding the solution through an extrusion die having an extrusion orifice, cooling the extruded solution by exposing the solution to a gas stream applied at essentially a right angle to the extruded solution immediately after extrusion and prior to introducing the extruded solution into a precipitation bath, and conveying the extruded solution to a precipitation bath.

2. Process according to claim 1 wherein the extruded solution is exposed to two gas streams.

3. Process according to claim 2 wherein each gas stream strikes the solution on opposite sides of the extruded solution.

4. Process according to claim 1 comprising extruding the solution in the form of a tube through an extrusion die having a ring-shaped orifice and cooling the tube shaped extruded solution by exposing the outside of the tube shaped extruded solution to a gas stream.

5. Process according to claim 1 comprising extruding the solution in the form of a tube through an extrusion die having a ring-shaped orifice and cooling the tube shaped extruded solution by exposing the inside of the tube shaped extruded solution to a gas stream.

6. Process according to claim 5 comprising extruding the solution in the form of a tube through an extrusion die having a ring-shaped orifice and cooling the tube shaped extruded solution by exposing the inside and outside of the tube shaped extruded solution to a gas stream.

7. Process according to claim 5 or 6 comprising contacting the inside of the tube shaped solution with a precipitation agent after cooling and prior to its introduction into a precipitation bath.

8. Process according to claim 1, 3, 4, 5 or 6 wherein the tertiary amine oxide is N-methylmorpholine-N-oxide.

9. Process according to claim 2 wherein the tertiary amine oxide is N-methylmorpholine-N-oxide.

10. Process according to claim 7 wherein the tertiary amine oxide is N-methylmorpholine-N-oxide.

* * * * *